Figure 1:
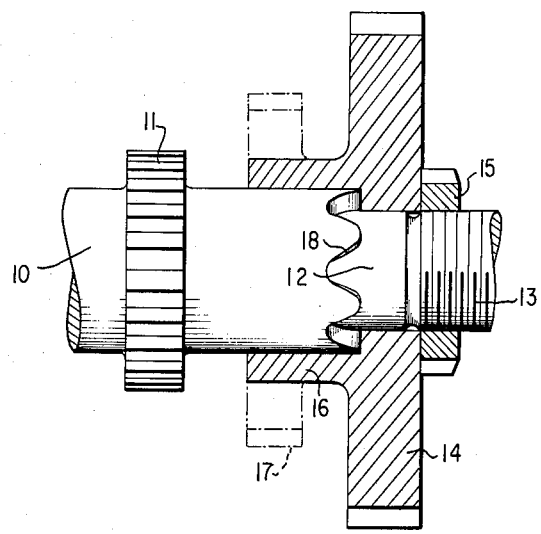

May 31, 1966 W. E. ALTMANN 3,253,844
NON-ROTATABLE CONNECTION
Filed May 22, 1961

INVENTOR.
WERNER E. ALTMANN
BY
Dicke, Craig & Freudenberg
ATTORNEYS

10

United States Patent Office 3,253,844
Patented May 31, 1966

3,253,844
NON-ROTATABLE CONNECTION
Werner E. Altmann, Stuttgart, Germany, assignor to Daimler-Benz Aktiengesellschaft, Stuttgart-Unterturkheim, Germany
Filed May 22, 1961, Ser. No. 111,801
Claims priority, application Germany, May 27, 1960, D 33,446
1 Claim. (Cl. 287—53)

The present invention relates to a non-rotatable connection between rotating machine elements or machine elements produced by rotation, especially change-speed transmission parts of motor vehicles, i.e., relates to a connection providing rotation in unison between two parts, whereby at both machine elements engaging parts are arranged in the manner of projections and recesses corresponding thereto and the machine elements interengage with one another in a form-locking manner by means of these engaging parts.

Connections of the aforementioned type are known as claw-clutches or so-called Hirth-serrations. The latter type consists of a toothed construction with sawlike or serrated profile at each of the two machine elements. The known connections of the prior art, however, have the disadvantage that they have to be manufactured by slotting and therefore require on both sides of the engaging parts provided for the connection free space, i.e., the so-called shears.

The present invention is concerned with the task of eliminating these disadvantages. This is realized with the connections of the type mentioned hereinabove by arranging as engaging parts at both machine elements cam tracks, closed in themselves, i.e., endless cam surfaces provided with continuous transitions.

The cam surfaces constructed in accordance with the present invention may be manufactured according to a further feature of the inventive concept during one turning operation. The machine element is thereby machined in accordance with the present invention by means of a turning or cutting tool the direction of feed of which extends either in parallel or at right angle to the axis of rotation and to which, in addition to this feed movement, a control movement is imparted producing the cam surfaces by any conventional control means, for example, by means of cams, templates or the like, which control movement, in turn, is directed also either in parallel or at right angle to the axis of rotation. As cutting tool may be used a forming or shaping tool, for example, in the manner of a slot cutting tool.

The connection according to the present invention offers the advantage that it may be utilized also in those cases in which no so-called shears may be provided at one or both sides of the cam surfaces intended for the connection. Consequently, the connection according to the present invention is particularly suitable for machine parts of change-speed transmissions of motor vehicles, where, for example, gear wheels, shifting sleeves or the like have to be equipped and connected with corresponding hub portions without shears. A further advantage of the present invention resides in the manufacture of the parts, normally obtained for the most part by turning, with the same machine tool and possibly also in the same clamping or chucking operation thereof.

According to a preferred embodiment of the present invention, the cam surfaces are constructed at both machine parts as sinusoidal cam surfaces. They may be arranged thereby in such a manner that they engage with each other either axially or radially. The connection according to the present invention therefore is not only suitable for axial but also for radial connections intended to produce rotation in unison.

Accordingly, it is an object of the present invention to provide a non-rotatable connection between machine parts intended to be connected for rotation in unison which avoids the disadvantages and shortcomings of the prior art connections noted hereinabove.

It is another object of the present invention to provide non-rotatable connections between adjoining machine parts which may be readily manufactured in a simple manner without complicated machining operations.

Still another object of the present invention resides in the provision of a form-locking connection between two machine parts, especially of change-speed transmissions, by means of engaging cam surfaces which may be readily machined, preferably during one and the same machining or turning operation.

Still a further object of the present invention resides in the provision of a method for machining engaging surfaces consisting of endless cam surfaces provided with continuous transitions which may be readily manufactured without requiring special cutting or turning tools and without requiring excessively large amounts of space in the manufacturing thereof.

Figure 2A:
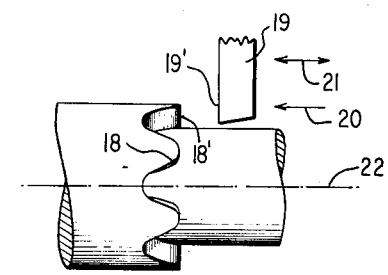
Figure 2B:
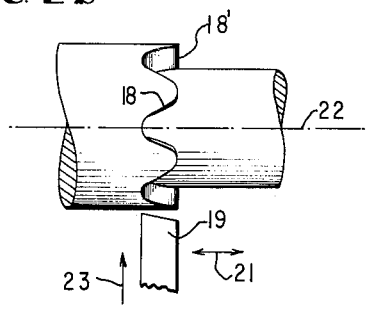
Figure 2C:
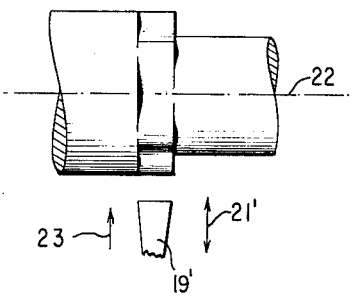
Figure 3:
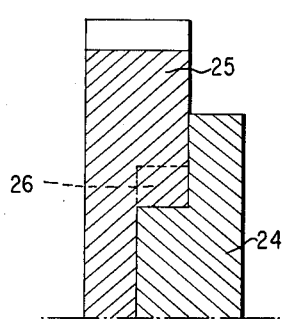
Figure 4:
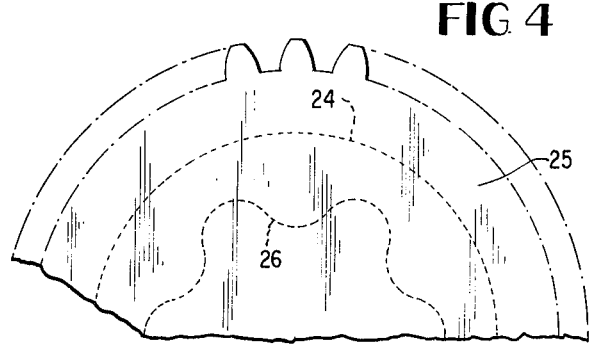

These and other objects, features and advantages of the present invention will become more obvious from the following description when taken in connection with the accompanying drawing which shows, for purposes of illustration only, several embodiments in accordance with the present invention, and wherein:

FIGURE 1 is a partial cross-sectional view through a non-rotatable connection according to the present invention between two gear wheels, FIGURE 2a is a schematic view illustrating the manufacture of the engaging parts according to FIGURE 1, FIGURES 2b and 2c are schematic views, similar to FIGURE 2a, illustrating modified arrangements for the manufacture of the engaging parts in accordance with the present invention, FIGURE 3 is a partial cross-sectional view of a non-rotatable connection with radially extending engaging parts, and FIGURE 4 is a partial elevational view of the connection illustrated in FIGURE 3.

Referring now to the drawing wherein like reference numerals are used throughout the various views to designate corresponding parts, and more particularly to FIGURE 1, reference numeral 10 designates therein a shaft which may be, for example, the countershaft of a motor vehicle change-speed transmission. A gear wheel 11 may be cut into the shaft 10 or may be suitably mounted thereon and secured thereto in any conventional manner. The shaft 10 is reduced to form an off-set part of reduced diametric dimension and provided with an externally threaded portion 13. A second gear wheel 14 is emplaced over the portion 12 and secured axially by means of a nut 15 or in other similar manner. The gear wheel 14 is provided with a relatively longer hub portion 16 which itself may possibly form a still further gear wheel 17 indicated in FIGURE 1 in dot and dash line.

In order to provide a non-rotatable connection of the shaft 10 with the gear wheel 14, i.e., to assure common rotation thereof, sinusoidally-shaped cam surfaces 18 are machined or turned into the same. The same cam surfaces are also arranged within the hub portion 16 of the gear wheel 14. The two cam surfaces interengage axially with one another and transmit thereby the torque from shaft 10 to the gear wheel body 14 and vice versa.

The cam surface 18 at the shaft 10 may be manufactured in one turning operation so that the entire shaft 10 with the exception of the teeth of the gear wheel body 11, may be machined by turning. The turning of the cam surfaces 18 is realized according to FIGURE 2a, in such a manner that the cutting tool 19 follows its feed movement in the direction of arrow 20 and machines the surface 18', i.e., the cam surface properly speaking, by means of the cutting edge 19' thereof. A control movement for the cutting tool 19 is superimposed on the feed movement of the cutting tool 19 which control movement is schematically indicated in FIGURE 2a by arrow 21 and may be obtained by any known conventional control means, for example, cams, templates or the like. In this manner, the cutting tool 19 cuts out of the shaft stock 10 a sinusoidally-shaped cam surface 18. Consequently, in this case, the feed and control movements are directed substantially parallelly.

As pointed out hereinabove, the feed movement and control movements indicated by arrows 20 and 21 may be obtained in any suitable conventional manner known in the prior art. For that purpose, any suitable drive connections including change-speed transmission means may be provided to drive the feed control means and the superimposed reciprocating control means from a common driving source. Since such control means are well known in the art, a detailed description and showing thereof is dispensed with herein.

A further possibility essentially consists, as shown in FIGURE 2b, by imparting to the same cutting tool 19 its feed movement directed substantially perpendicularly to the axis of rotation 22 in the direction of arrow 23. The control movement of this cutting tool 19, however, takes place in the embodiment of FIGURE 2b in the direction of arrow 21 as in the embodiment of FIGURE 2a, in other words, in the embodiment of FIGURE 2b the feed and control movements for the cutting tool 19 are disposed essentially at right angles to each other. Again, the feed and control movements may be obtained by any conventional known means appropriate for such purposes.

According to FIGURES 3 and 4, the gear wheel body 25 is non-rotatably secured with a flange 24 by the sinusoidally-shaped cam surfaces 26 and is axially secured in any known manner (not illustrated herein). These cam surfaces 26 may also be manufactured at both parts or at least at the flange 24 in a corresponding turning operation. For that purpose, one has to imagine only that with machine tool arrangements according to FIGURE 2c the cutting tool 19' carries out its control movement 21', not parallelly to the axis of rotation 22, as shown in FIGURES 2a and 2b, but parallelly to the direction of feed movement 23. Again, the feed and control movements in FIGURE 2c may be obtained by any suitable control means known in the art.

By the use of the machining method illustrated in FIGURE 2c, there are obtained the sinusoidally-shaped cam surfaces 26 illustrated in FIGURE 4. The cutting tool 19' itself is thereby constructed approximately as a groove or slot cutting tool the width of which corresponds to the intended profile width as shown in FIGURE 2c.

While I have shown and described several embodiments in accordance with the present invention, it is understood that the same is not limited thereto but is susceptible of many changes and modifications within the spirit and scope thereof, and I therefore do not wish to be limited to the details shown and described herein, but intend to cover all such changes and modifications as are encompassed by the scope of the appended claim.

I claim:

A shaft member having a reduced cylindrical portion and an enlarged cylindrical portion adjacent thereto providing an annular radial shoulder at the intersection of said portions, said shoulder having axial projections and recesses with continuous transition surfaces therebetween which together are in the form of a continuous annular sinusoidal configuration about the peripheral end of said enlarged cylindrical portion, a machine member having a reduced bore portion secured on said reduced cylindrical portion adjacent said shoulder and also having at one end an enlarged cylindrical hub portion extending axially therefrom and about said enlarged cylindrical portion and said radial shoulder, said machine member also having a series of axial projections and recesses with continuous transition surfaces therebetween, which are in the form of an annular sinusoidal configuration adjacent said reduced bore portion and within said hub portion, said axial projections of said shaft member and said machine member interengaging so as to secure said machine member in driving relationship and a retaining means on said reduced cylindrical portion adjacent to the other end of said machine member holding said machine member against said shoulder.

References Cited by the Examiner

UNITED STATES PATENTS

| | | | |
|---|---|---|---|
| 675,469 | 6/1901 | Derrer | 82—18 |
| 820,194 | 5/1906 | Hoffman | 64—29 X |
| 1,126,219 | 1/1915 | Hupp | 64—29 |
| 1,274,321 | 7/1918 | Petito. | |
| 1,821,543 | 9/1931 | Coultas. | |
| 2,008,474 | 7/1935 | Smith | 82—18 |
| 2,192,267 | 3/1940 | Kelley | 82—19 |
| 2,714,325 | 8/1955 | Junker | 82—18 |
| 2,737,033 | 3/1956 | Bendall. | |
| 2,974,984 | 3/1961 | Koch | 287—53 |
| 2,998,988 | 9/1961 | Barrett | 287—53 |

FOREIGN PATENTS

| | | |
|---|---|---|
| 850,296 | 9/1939 | France. |
| 313,709 | 7/1919 | Germany. |

CARL W. TOMLIN, *Primary Examiner.*

RICHARD H. EANES, WILLIAM W. DYER, JR.,
*Examiners.*

L. VLACHOS, A. V. KUNDRAT, *Assistant Examiners.*